United States Patent Office 3,473,823
Patented Oct. 21, 1969

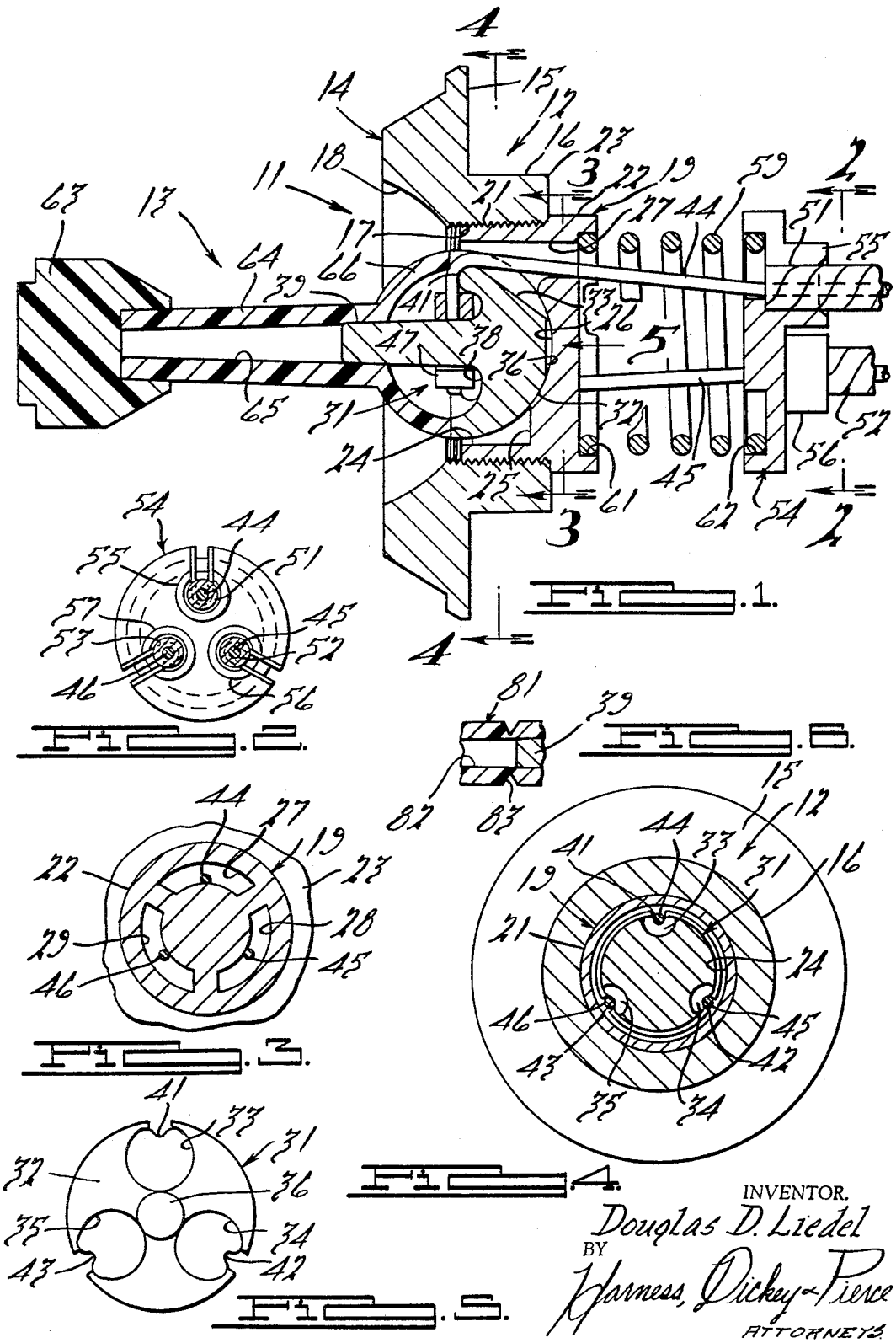

3,473,823
REMOTE CONTROLLER
Douglas D. Liedel, Belleville, Mich., assignor to C. M. Hall Lamp Company, a corporation of Michigan
Filed Apr. 7, 1967, Ser. No. 629,176
Int. Cl. B60r 1/02, 11/00
U.S. Cl. 280—150                    11 Claims

ABSTRACT OF THE DISCLOSURE

This application discloses a control actuator for adjusting the position of a remotely located article such as an outside rear view mirror of a motor vehicle. The controller is comprised of a supporting member upon which a control lever is supported for pivotal movement. The control lever is constructed in such a way that it will yield or sever under the application of a relatively low force such as that which may be exerted if an occupant is thrown against the control lever whereby the occupant will not be injured. Flexible transmitters, comprised of wire actuators and associated respective protective sheaths are interconnected between the control lever and the remote device for transmitting a control signal to the remote device. One end of each of the wire actuators is connected to the control lever and the respective end of each sheath is connected to an adjacent retaining member. A coil spring is interposed between the supporting member and the retainer member for tensioning the wire actuators and for compensating for any misalignment.

BACKGROUND OF THE INVENTION

This invention relates to a remote control actuator and more particularly to an improved control device for actuating a remotely controlled article such as an automotive rear view mirror.

One relatively well known form of remote control device is the remote controlled automotive rear view mirror. In such a device, a control lever supported within the passenger compartment of the vehicle is connected to an externally supported mirror by means of flexible transmitters for control of the position of the mirror. With this type of construction the control lever, its supporting assembly and the associated flexible transmitters are threaded through holes in the exterior body sheet metal, around the internal mechanism of the door and through an opening in the door panel. This necessitates that the control member be a relatively small device. This small size aggravates the problem of providing a structure that will give the desired range of adjustment. This problem is further amplified by the fact that the flexible transmitters are normally preadjusted and adjustment or other compensation, heretofore has not been possible once the assembled device is installed in the motor vehicle.

It is, therefore, an object of this invention to provide an improved, compact remote control device.

It is another object of the invention to provide a remote control device that is itself compensating.

It is another object of this invention to provide an improved compact control device for a remote control mirror.

As has been noted, the remote control actuator includes a control element that is positioned within the passenger compartment of the vehicle. Normally, some form of control lever or control knob is used for this purpose thus presenting an object against which an occupant of the vehicle might be thrown in an accident.

It is yet a further object of this invention to provide a control lever for a remote control device that offers improved safety.

It is a still further object of this invention to provide a control device for a remote control mechanism that will yield or fracture upon impact to preclude injury to a vehicle occupant thrown against the control device.

SUMMARY OF THE INVENTION

A control assembly embodying this invention is particularly adapted for the remote control of a distant article. The control assembly comprises the base and the control lever supported for pivotal movement relative to the base. A retainer is juxtaposed to the base and biasing means are interposed between the base and the retainer for urging the base and retainer away from each other. Flexible transmitter means comprised of a wire member and a sheath member encircling the wire member are associated with the control assembly. Means affix one end of one of the flexible transmitter members to the retainer and means affix the respective end of the other of the flexible transmitter members to the control lever for transmitting a control signal through the flexible transmitter means upon pivotal movement of the control member.

A safety control lever embodying this invention is particularly adapted for use in a control assembly of the type described in the preceding paragraph. The control lever is adapted to deform or sever when a predetermined, relatively low force is exerted upon the lever. This minimizes the possibility of injury to an individual who may be thrown into contact with the control lever.

BRIEF DESCRIPTION OF THE DRAWINGS

FIGURE 1 is a cross sectional view of a remote control actuator embodying this invention.

FIGURE 2 is a cross sectional view taken along the line 2—2 of FIGURE 1.

FIGURE 3 is a cross sectional view taken along the line 3—3 of FIGURE 1.

FIGURE 4 is a cross sectional view taken along the line 4—4 of FIGURE 1.

FIGURE 5 is a plan view of a portion of the control device shown in FIGURE 1.

FIGURE 6 is a fragmentary side elevational view of a control lever showing another embodiment of the invention.

DETAILED DESCRIPTION OF THE PREFERRED EMBODIMENTS

In the drawings, the reference numeral 11 indicates a control device embodying this invention, which device is particularly adapted for controlling the position of the remotely located article such as an outside rear view mirror of a motor vehicle. The control device 11 is comprised of a mounting portion, indicated generally by the reference numeral 12, and a control lever assembly, indicated generally by the reference numeral 13.

The mounting portion 12 is comprised of a bezel member 14 having an inner surface 15 that is adapted to be abuttingly engaged with a panel that forms a portion of the interior of a vehicle body, such as the door panel (not shown). A cylindrical section 16 of the bezel 14 is adapted to extend through an opening in the associated panel and toward the interior of the vehicle sheet metal. A tapped opening 17 extends concentrically through the cylindrical portion 16 and terminates in a recess 18 having a shape that is generally a segment of a sphere.

A supporting member, indicated generally by the reference numeral 19, is formed with an externally threaded projection 21 that is threadingly received in the tapped opening 17 of the bezel member 14. An enlarged head portion 22 formed adjacent the threaded projection 21 engages a shoulder 23 formed in the end of the bezel member cylindrical portion 16. The supporting member 19 is formed with a generally cylindrical cavity 24 that opens through the face adjacent the bezel member cavity 18. The cavity 24 terminates in an end wall 25 in which a socket cavity 26 is formed. The socket cavity 26 has the general shape of a segment of a sphere and is surrounded by a plurality of arcuate, circumferentially spaced slots 27, 28 and 29 (FIGURE 3).

A control member, indicated generally by the reference numeral 31, is supported within the cavities 18 and 24 of the bezel member 14 and supporting member 19, respectively. The control member 31 has a surface 32 which is generally the shape of a segment of a sphere and which surface is held in engagement with the socket cavity 26 in a manner that will become more apparent as this description proceeds. The control member 31 is, therefore, supported for universal pivotal movement with respect to the supporting assembly 12.

The control member 31 is formed with three circumferentially spaced generally flattened areas 33, 34 and 35 (FIGURE 5) that are generally aligned with the slots 27, 28 and 29, respectively, when the control member 31 is supported in the socket cavity 26. A flattened area 36 is also formed in the control member surface 32, which area 36 lies adjacent the base of the socket cavity 26 when the control member 31 is in the neutral position. The side of the control member 31 opposite to the surface 32 is defined by a surface 38 that is generally in the shape of a segment of a torus. A generally cylindrical, integral projection 39 extends upwardly from the surface 38 and outwardly of the bezel member cavity 18. Rounded grooves 41, 42 and 43 extend from the surfaces 33, 34 and 35 to the surface 38 across the periphery of the control member 31.

Control wires 44, 45 and 46 are affixed at one of their ends to the control member 31 adjacent the surface 38, as by means of a respective fastener that is shown schematically and which is identified by the reference numeral 47. The control wires 44, 45 and 46 extend across the rounded surfaces 41, 42 and 43, respectively, and pass through the slots 27, 28 and 29 in the supporting member 19 (FIGURE 3). The opposite ends of the wires 44, 45 and 46 are connected to the article to be controlled in any known manner. The disclosed construction, as has been noted, is particularly adapted to control an externally positioned rear view mirror of a motor vehicle and reference may be made to United States Letters Patent 3,195,370, entitled "Remote Control Unit," issued July 20, 1965, in the name of Robert J. Smith, for a showing of one suitable manner in which the control wires 44, 45 and 46 may be connected to the remotely positioned mirror. It is to be understood, however, that the control unit may be used to operate other types of remotely positioned devices or may be connected to other types of rear view mirrors and in different manners. The flexible wires 44, 45 and 46 are maintained under sufficient tension through adjustment or by means of springs so as to maintain the control member 31 in bearing relationship with the socket cavity 26.

Each of the wires 44, 45 and 46 is encircled along a major portion of its length by a respective flexible protective sheath 51, 52 or 53. A retaining member 54 having a generally cylindrical configuration is juxtaposed to the supporting assembly 12 and defines a plurality of generally cylindrical extensions 55, 56 and 57 that define openings in which the respective ends of the protective sheaths 51, 52 and 53 are received and affixed in any known manner (FIGURE 2). A coil spring 59 encircles the wires 44, 45 and 46 between the supporting member 19 and the retaining member 54. The spring 59 is received in a pocket 61 formed in the supporting member 19 and a like pocket 62 formed in the retaining member 54. The spring 59 urges the retaining member 54 away from the supporting assembly 12 and will permit some pivotal movement of the retaining member 54 relative to the supporting assembly 12. This in effect provides for a self-compensation for any misalignments which might otherwise occur upon installation and assists in maintaining the desired tension upon the components.

The control lever assembly 13 is associated with the control member 31 for adjusting its angular position. The control lever assembly 13 includes an enlarged knob 63 that is fixed to a supporting shank portion 64. The shank portion 64 has a cylindrical opening 65 that may be received upon the control member projection 39 with a press or snap fit. The inner end of the shank portion 64 terminates at an integral section 66 that has the shape of a segment of a sphere. The section 66 is of the same diameter as the diameter of the control member surface 32.

Under certain conditions the occupants of the vehicle might be thrown against the control lever assembly 13 thus causing the possibility of injury. Several different embodiments or arrangements for reducing the possibility of injury under these circumstances are disclosed below. In a first embodiment, the control lever shank portion 64 has a relatively loose slip fit upon the control member projection 39. Thus, if an occupant is thrown against the control lever assembly 13, the knob 63 and shank portion 64 will part from the control assembly 31 without causing injury to the occupants. In another embodiment, the shank portion 64 may be formed from polyethylene or polypropylene or some other relatively soft plastic. Preferably the design is such that the shank portion 64 will deflect under the force of about 90 pounds so as to reduce the possibility of injury. In another embodiment, the shank portion 64 is formed from a plastic or other material that is relatively brittle. In this embodiment, the portion 64 should fracture at a force of about 90 pounds. The thin wall section provided by the opening 65 will assist in this fracturing. Fracturing may also be promoted by the embodiment shown in FIGURE 7. In this embodiment, the control lever shank portion is shown only partially and is identified generally by the reference numeral 81. As in the previously described embodiment, the lever 81 is formed with a cylindrical bore 82 that may be press fit onto the projection 39 of the control member. A notch 83 is formed around the circumference of the lever shank portion 81 adjacent the end of the projection 39. The notch 83 will weaken the lever 81 in bending and any substantial force exerted on the lever 81 will cause it to fracture at the notch 83. It is to be understood that any of the foregoing noted safety features may be used either individually or in combination with each other.

It should be readily apparent that the disclosed embodiments provide a relatively compact, safe control actuator device. In addition, the device is self compensating for minor manufacturing variations or variations caused by installation. In addition, the tension on the individual wires 44, 45 and 46 may be readily adjusted by removing the control knob 64, thus affording free access to the ends of the control wires 44, 45 and 46 at the point where they are fixed to the control member 31.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A control assembly for a remote control device, said control assembly comprising a base, a control lever supported for pivotal movement by said base, a retainer juxtaposed to said base and movable with respect thereto, biasing means interposed between said base and said retainer for urging said base and said retainer away from each other, flexible transmitter means comprised of a wire member and a sheath member encircling said wire member, means affixing one end of one of said flexible transmitter members to said retainer, and means affixing the respective end of the other of said flexible transmitter members to said control lever for transmitting a control signal through said flexible transmitter means upon pivotal movement of said control member.

2. A control assembly as set forth in claim 1 wherein opposing faces of the base and the retainer are formed with cup-shaped depressions, the biasing means comprising coil spring means having its opposite ends received in a respective one of the depressions in said base and said retainer.

3. A control assembly as set forth in claim 2 wherein the flexible transmitter means comprises a plurality of flexible transmitters, each of said flexible transmitters comprising a wire member and a respective sheath member, the one end of the sheath members being affixed to the retainer and the respective ends of the wire members being affixed to the control lever, the coil spring encircling said wire members.

4. A control assembly for a remote control device, said control assembly comprising a bezel member defining a female threaded cavity therein, a supporting member having a male threaded portion received in said female threaded cavity of said bezel member, said supporting member defining a cavity in one face thereof terminating in an end wall defining a socket cavity, a plurality of arcuate circumferentially spaced cavities defined in said end wall around said socket cavity and through which wire actuators are adapted to extend, and a control member having a surface in bearing relationship with said socket cavity for pivotally supporting said control member upon said supporting member, said control member having an outwardly extending end portion for facilitating manipulation of said control member, said control member further providing means for attachment of control wires thereto.

5. A control assembly as set forth in claim 4 further including a control lever having a knob portion, and a shank portion defining a cavity adapted to receive and be affixed to the extending portion of the control member for fixing said control lever to said control member.

6. A control assembly as set forth in claim 5 wherein the control lever further includes an enlarged portion at the end of said shank portion opposite to said knob, said enlarged portion of said control lever being complementary in shape with the external periphery of the control member and abuttingly engaged therewith for concealing the attached ends of the control wires.

7. A control assembly as set forth in claim 5 wherein the control lever shank portion is formed from a resilient material adapted to yield upon the exertion of a predetermined relatively low force thereupon to minimize injury to an individual thrown into contact therewith.

8. A control assembly as set forth in claim 5 wherein the control lever shank portion is formed from a relatively brittle material for fracturing thereof under a predetermined relatively low force to minimize injury to an individual thrown into contact therewith.

9. A control assembly as set forth in claim 8 wherein the control lever shank portion is formed as a hollow thin wall section to facilitate fracturing thereof.

10. A control assembly as set forth in claim 8 wherein a notch is formed around the periphery of the control lever shank portion adjacent the end of the extending portion of the control member to facilitate fracturing of said shank portion adjacent said control member extending portion.

11. A control assembly as set forth in claim 5 wherein the control lever is received on the extending portion of the control member with a relatively loose fit to facilitate separation of said control lever from said control member upon the exertion of a predetermined relatively low force thereupon to minimize injury to an individual thrown into contact therewith.

References Cited

UNITED STATES PATENTS

| 1,630,217 | 5/1927 | Rasor. |
| 3,046,841 | 7/1962 | Kawecki. |
| 3,191,455 | 6/1965 | Fuqua et al. |
| 3,195,369 | 7/1965 | Warhol. |
| 3,195,370 | 7/1965 | Smith. |

LEO FRIAGLIA, Primary Examiner

J. E. SIEGEL, Assistant Examiner

U.S. Cl. X.R.

74—501